US011930850B2

(12) United States Patent
Yoon et al.

(10) Patent No.: US 11,930,850 B2
(45) Date of Patent: Mar. 19, 2024

(54) AEROSOL GENERATING DEVICE WITH MOVEABLE HEATER AND AEROSOL GENERATING SYSTEM INCLUDING THE SAME

(71) Applicant: KT&G CORPORATION, Daejeon (KR)

(72) Inventors: Sung Wook Yoon, Gyeonggi-do (KR); Seung Won Lee, Gyeonggi-do (KR); Dae Nam Han, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 699 days.

(21) Appl. No.: 17/058,173

(22) PCT Filed: Jul. 29, 2020

(86) PCT No.: PCT/KR2020/009988
§ 371 (c)(1),
(2) Date: Nov. 24, 2020

(87) PCT Pub. No.: WO2021/025363
PCT Pub. Date: Feb. 11, 2021

(65) Prior Publication Data

US 2022/0295888 A1 Sep. 22, 2022

(30) Foreign Application Priority Data

Aug. 5, 2019 (KR) ........................ 10-2019-0094956

(51) Int. Cl.
*A24F 40/46* (2020.01)
*A24D 1/20* (2020.01)
(Continued)

(52) U.S. Cl.
CPC ................ *A24F 40/46* (2020.01); *A24D 1/20* (2020.01); *A24F 40/10* (2020.01); *A24F 40/20* (2020.01);
(Continued)

(58) Field of Classification Search
CPC ............................... A24F 40/46; A24F 40/465
See application file for complete search history.

(56) References Cited

U.S. PATENT DOCUMENTS 5,095,921 A 3/1992 Losee et al.
5,269,327 A 12/1993 Counts et al.
(Continued)

FOREIGN PATENT DOCUMENTS

CN 102264251 A 11/2011
CN 102665459 A 9/2012
(Continued)

OTHER PUBLICATIONS

Office Action dated Apr. 20, 2023 in Chinese Application No. 202080003270.1.
(Continued)

*Primary Examiner* — Neil Abrams
(74) *Attorney, Agent, or Firm* — Sughrue Mion, PLLC

(57) ABSTRACT

An aerosol generating device includes an accommodation portion configured to accommodate an aerosol generating article through an opening, a heater configured to heat the accommodation portion and move along a longitudinal direction of the accommodation portion; and a heater support that supports the heater and move the heater along the longitudinal direction of the accommodation portion, wherein the heater moves between a first position corresponding to a first point of the aerosol generating article and a second position corresponding to a second point of the aerosol generating article, and wherein the first position and
(Continued)

the second position differ according to specifications of the aerosol generating article.

14 Claims, 10 Drawing Sheets

(51) Int. Cl.

| | |
|---|---|
| ***A24F 40/10*** | (2020.01) |
| ***A24F 40/20*** | (2020.01) |
| ***A24F 40/30*** | (2020.01) |
| ***A24F 40/53*** | (2020.01) |
| ***H05B 3/06*** | (2006.01) |

(52) U.S. Cl.

CPC .............. *A24F 40/30* (2020.01); *A24F 40/53* (2020.01); *H05B 3/06* (2013.01)

(56) References Cited

U.S. PATENT DOCUMENTS

| | | | | |
|---|---|---|---|---|
| 5,598,868 | A | 2/1997 | Jakob et al. | |
| 9,999,247 | B2 | 6/2018 | Ruscio et al. | |
| 10,687,553 | B2 | 6/2020 | Kaufman et al. | |
| 11,064,739 | B2 * | 7/2021 | Gimkiewicz | A24F 40/40 |
| 11,382,356 | B2 * | 7/2022 | Worm | A24F 40/46 |
| 11,607,511 | B2 * | 3/2023 | Conner | A61M 11/042 |
| 2011/0155151 | A1 | 6/2011 | Newman et al. | |
| 2014/0202476 | A1 * | 7/2014 | Egoyants | H05B 1/0291 131/329 |
| 2019/0261685 | A1 * | 8/2019 | Sebastian | A24D 1/002 |
| 2020/0163380 | A1 | 5/2020 | Lee et al. | |
| 2020/0221773 | A1 | 7/2020 | An | |
| 2020/0305512 | A1 | 10/2020 | Lim et al. | |
| 2020/0316325 | A1 | 10/2020 | Reevell | |
| 2020/0352231 | A1 | 11/2020 | Han et al. | |
| 2020/0404969 | A1 | 12/2020 | Zuber et al. | |
| 2021/0015160 | A1 * | 1/2021 | Moloney | A24F 40/51 |
| 2021/0076736 | A1 | 3/2021 | Fernando et al. | |
| 2021/0076741 | A1 * | 3/2021 | Chen | A24F 40/42 |
| 2022/0295888 | A1 * | 9/2022 | Yoon | A24D 1/20 |
| 2022/0330612 | A1 * | 10/2022 | Liao | A24F 40/42 |

FOREIGN PATENT DOCUMENTS

| | | | |
|---|---|---|---|
| CN | 108323824 | A | 7/2018 |
| CN | 208192124 | U | 12/2018 |
| JP | 06-46818 | A | 2/1994 |
| JP | 6-315366 | A | 11/1994 |
| JP | 2017-18139 | A | 1/2017 |
| JP | 2017-510270 | A | 4/2017 |
| JP | 2019-520051 | A | 7/2019 |
| KR | 10-0178387 | B1 | 2/1999 |
| KR | 10-2007-0073962 | A | 7/2007 |
| KR | 10-2014-0092312 | A | 7/2014 |
| KR | 10-2018-0070509 | A | 6/2018 |
| KR | 10-2018-0124739 | A | 11/2018 |
| WO | 2013/034456 | A1 | 3/2013 |
| WO | 2014/140320 | A1 | 9/2014 |
| WO | 2018/190603 | A1 | 10/2018 |
| WO | 2019/030170 | A1 | 2/2019 |
| WO | 2019/030172 | A1 | 2/2019 |
| WO | 2019/088587 | A2 | 5/2019 |
| WO | 2019121668 | A1 | 6/2019 |

OTHER PUBLICATIONS

Communication dated Jan. 25, 2021, issued by the Korean Intellectual Property Office in Korean Application No. 10-2019-0094956.

International Search Report dated Feb. 9, 2021, from the International Searching Authority in International Application No. PCT/KR2020/009988.

Extended European Search Report dated Nov. 8, 2021, issued by the European Patent Office in application No. 20811226.8.

Communication dated Jan. 11, 2022, issued by the Japanese Patent Office in application No. 2020-573434.

* cited by examiner

AEROSOL GENERATING DEVICE WITH MOVEABLE HEATER AND AEROSOL GENERATING SYSTEM INCLUDING THE SAME

CROSS REFERENCE TO RELATED APPLICATIONS

This application is a National Stage of International Application No. PCT/KR2020/009988, filed Jul. 29, 2020, claiming priority to Korean Patent Application No. 10-2019-0094956, filed Aug. 5, 2019.

TECHNICAL FIELD

The present disclosure relates to an aerosol generating device and an aerosol generating system including the same, and more particularly, to an aerosol generating device that may effectively heat an aerosol generating article by using a movable heater and an aerosol generating system including the same.

BACKGROUND ART

Recently, demand for alternatives to traditional cigarettes has increased. For example, there is growing demand for aerosol generating devices that generate aerosol by heating an aerosol generating material contained in an aerosol generating article (e.g., a cigarette) rather than by combusting an aerosol generating article. Accordingly, studies on a heating-type aerosol generating article and a heating-type aerosol generating device have been actively conducted.

DISCLOSURE

Technical Solution

An aerosol generating article accommodated in an aerosol generating device may include, for example, a liquid portion including a liquid composition and a medium portion including a tobacco material. In this case, the flavor and taste of an aerosol generated when the aerosol generating article is heated by the aerosol generating device may be determined by internal components of the aerosol generating article.

That is, the flavor and taste of the generated aerosol may be changed according to types of components that constitute the inside of the aerosol generating article, arrangement thereof, heated parts thereof, and a heating profile of the aerosol generating device. In an aerosol generating device according to the related art, a plurality of separate heaters are used to provide an aerosol having an excellent flavor and taste.

In this case, a plurality of heaters are heated to different temperatures to heat the aerosol generating article with various heating profiles.

However, in an aerosol generating device including a plurality of divided heaters according to the related art, all of the plurality of heaters need to be positioned inside the aerosol generating device, but an aerosol generating device has limited space. Moreover, the consumption of energy in the aerosol generating device may be increased by the plurality of heaters. Thus, miniaturization of an aerosol generating device including a plurality of divided heaters according to the related art is difficult, and energy efficiency is lowered since a lot of energy is consumed from the limited capacity of the battery. This low energy efficiency requires frequent charging of the battery and thus may cause inconvenience of a user.

Furthermore, an aerosol generating device including a plurality of divided heaters according to the related art may have shortcomings, such as external heat generation, low internal durability, difficulty in assembly, and an increase in the cost of components, which may cause disadvantageous conditions for the manufacture and use of the aerosol generating device.

According to an aspect of the present disclosure, an aerosol generating device includes an accommodation portion configured to accommodate an aerosol generating article through an opening, a heater configured to heat the accommodation portion and move along a longitudinal direction of the accommodation portion; and a heater support that supports the heater and move the heater along the longitudinal direction of the accommodation portion, wherein the heater moves between a first position corresponding to a first point of the aerosol generating article and a second position corresponding to a second point of the aerosol generating article, and wherein the first position and the second position differ according to specifications of the aerosol generating article.

Advantageous Effects

An aerosol generating device and an aerosol generating system including the same according to embodiments include a heater that may detect an aerosol generating article and is movable to a position corresponding to a certain point of the aerosol generating article according to the detected aerosol generating article.

In the aerosol generating device and the aerosol generating system including the same according to embodiments, the aerosol generating article may be heated with various heating profiles without a plurality of separate heaters according to the related art. Various heating profiles of the aerosol generating device may effectively heat the aerosol generating article so that the flavor and taste of the generated aerosol may be improved.

In addition, the aerosol generating device and the aerosol generating system including the same according to embodiments may increase energy use efficiency through effective heating. This may increase the user's convenience by reducing the charging frequency of the aerosol generating device, and the stability of the aerosol generating device and safety of a user may be improved by preventing external heat generation more effectively.

BEST MODE

Figure 1A:
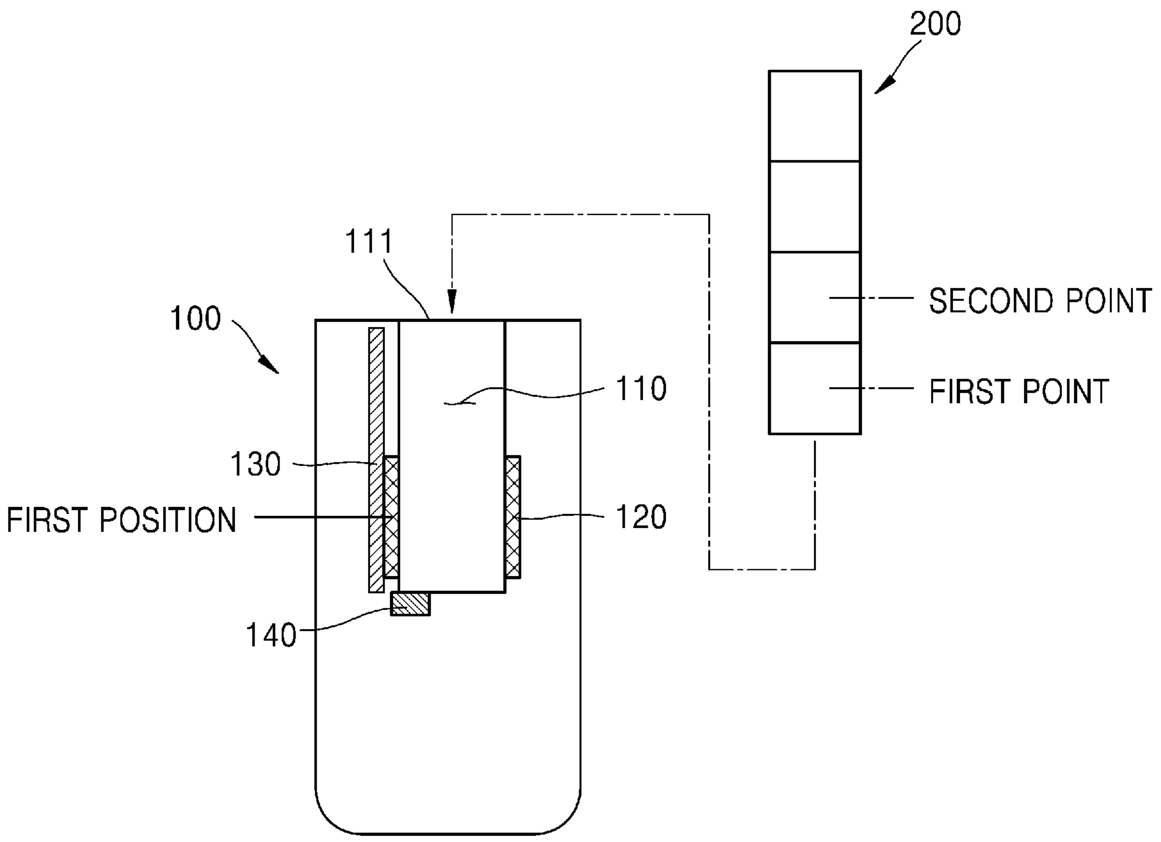
FIG. 1A is a cross-sectional view illustrating one aspect of an aerosol generating device in which an aerosol generating article is accommodated, according to an embodiment.

According to an aspect of the present disclosure, an aerosol generating device includes an accommodation portion configured to accommodate an aerosol generating article through an opening, a heater configured to heat the accommodation portion and move along a longitudinal direction of the accommodation portion; and a heater support that supports the heater and move the heater along the longitudinal direction of the accommodation portion, wherein the heater moves between a first position corresponding to a first point of the aerosol generating article and a second position corresponding to a second point of the aerosol generating article, and wherein the first position and the second position differ according to specifications of the aerosol generating article The aerosol generating device may further include a detecting sensor configured to detect the specifications of the aerosol generating article.

The second position may be between the first position and the opening of the accommodation portion.

The heater may surround at least part of the accommodation portion and may slide in the longitudinal direction of the accommodation portion.

The aerosol generating device may further include a puff sensor configured to measure a duration of a single puff of a user, and the heater may move from the first position to the second position over the duration The heater may move from the first position to the second position over a duration of user's smoking on a single aerosol generating article.

The heater may move from the first position to the second position over a predetermined time period.

The aerosol generating article may include a first section in which the first point is located, and a second section in which the second point is located.

The heater may surround at least part of the first section and at least part of the second section, when the heater is at the first position.

The size of an area of the first section surrounded by the heater may be greater than the size of an area of the second section surrounded by the heater, when the heater is at the first position. The heater may surround at least part of the first section and the second section, when the heater is at the second position.

The size of an area of the second section surrounded by the heater may be greater than the size of an area of the first section surrounded by the heater, when the heater is at the second position.

The heater may include a plurality of heating compartments, and the plurality of heating compartments may have respective movement mechanisms.

The movement mechanisms may include at least one of a first movement mechanism for moving from the first position to the second position, and a second movement mechanism for moving from the second position to the first position.

The heater support may include a plurality of support members which respectively support and move the plurality of heating compartments along the longitudinal direction of the accommodation portion, and the heating compartments may be moved by the support members.

The plurality of heating compartments may be partitioned in a circumferential direction of the heater.

According to another aspect of the present disclosure, an aerosol generating system includes an aerosol generating device according to an embodiment and according to another embodiment, and an aerosol generating article accommodated in the aerosol generating device.

The aerosol generating article may include a first section and a second section, and the first section may be a material portion including an aerosol generating material, and the second section may be a medium portion including a medium.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Through the specification, a "longitudinal direction" of a component may be a direction in which the component extends along a longitudinal axis of the component (i.e., in the direction of the length of the component), as widely used in the art.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Figure 1B:
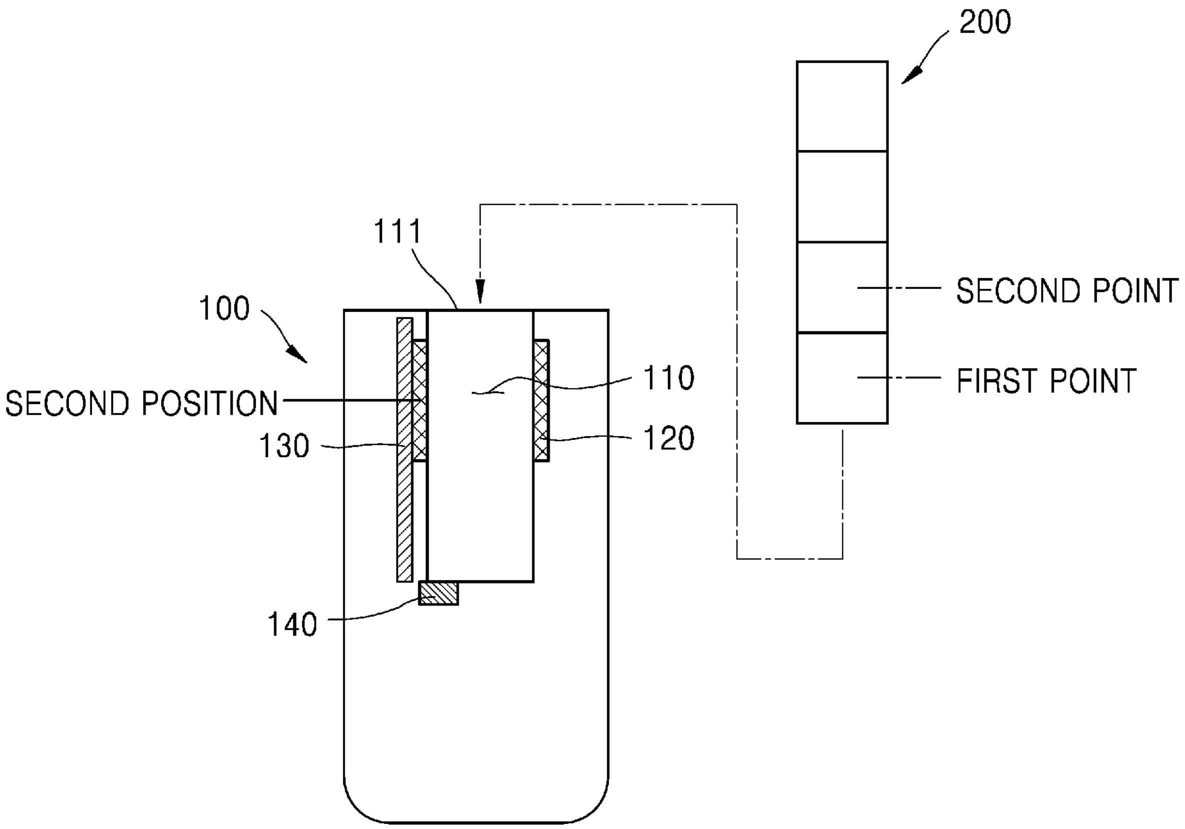
FIG. 1B is a cross-sectional view illustrating another aspect of an aerosol generating device in which an aerosol generating article is accommodated, according to an embodiment.

FIG. 1A is a cross-sectional view illustrating an aerosol generating device 100 in which an aerosol generating article 200 is accommodated, according to an embodiment, and FIG. 1B is a cross-sectional view illustrating the aerosol generating device 100 in which the aerosol generating article 200 is accommodated, according to another embodiment. For example, one aspect of the aerosol generating device 100 shown in FIG. 1A is a cross-sectional view when a heater 120 of the aerosol generating device 100 is at a first position, and another aspect of the aerosol generating device 100 shown in FIG. 1B is a cross-sectional view when the heater 120 of the aerosol generating device 100 is at a second position.

The aerosol generating device 100 according to an embodiment will be described in more detail with reference to FIGS. 1A and 1B.

The aerosol generating device 100 according to an embodiment may include an accommodation portion 110 for accommodating an aerosol generating article 200 through an opening 111, a heater 120 that transfers heat to the accommodation portion 110 and is movable along a longitudinal direction of the accommodation portion 110, and a heater support 130 that supports the heater 120 and moves the heater 120 along the longitudinal direction of the accommodation portion 110. The heater 120 moves between the first position and the second position in the aerosol generating article 200. The arrangement of the first position and the second position may differ according to the design of the aerosol generating article 200. The aerosol generating device 100 may include at least one processor to control the heater support 130 to move the heater 120 or to directly control movement of the heater 120.

The aerosol generating device 100 according to an embodiment may include the accommodation portion 110 for accommodating the aerosol generating article 200 through the opening 111, and the heater 120 that transfers heat to the accommodation portion 110 and is movable along the longitudinal direction of the accommodation portion 110.

The opening 111 through which the aerosol generating article 200 is inserted into the accommodation portion 110 may be formed at one end of the aerosol generating device 100 according to an embodiment, and the aerosol generating article 200 may be inserted into the accommodation portion 110 through the opening 111. A cavity may be formed inside the accommodation portion 110 so as to accommodate the aerosol generating article 200.

The accommodation portion 110 may have the shape and size corresponding to the aerosol generating article 200 so as to accommodate the aerosol generating article 200. For example, when the aerosol generating article 200 has a cylindrical shape, the accommodation portion 110 may also have a cylindrical shape cavity so as to accommodate the aerosol generating article 200. However, the shapes of the aerosol generating article 200 and the accommodation portion 110 are not limited thereto, and may be changed according to necessity.

The aerosol generating article 200 may be inserted into the accommodation portion 110 through the opening 111 and then may be heated by the heater 120. The opening 111 may be aligned with the cavity inside the accommodation portion 110, and the sizes and shapes of the cross-section of the opening 111 and the cross-section of the aerosol generating article 200 may correspond to each other.

The aerosol generating device 100 according to an embodiment may generate aerosol by heating the aerosol generating article 200 accommodated in the accommodation portion 110, and the heater 120 for heating the aerosol generating article 200 may be arranged in the aerosol generating device 100. The heater 120 may transfer heat to the accommodation portion 110 and may be movable in the longitudinal direction of the accommodation portion 110.

Components of the aerosol generating device 100 according to an embodiment are not limited to the components shown in the drawings, and may further include other components.

For example, in the aerosol generating device 100 according to an embodiment, the aerosol generating device 100 according to an embodiment may further include a battery (not shown) for supplying power to the heater 120.

The battery may supply power to be used for the aerosol generating device 100 to operate. For example, the battery may supply power for the heater 120 to be heated. Also, the battery may supply power for operations of a display, a sensor, a motor, etc. of the aerosol generating device 100.

The heater 120 may be heated by the power supplied from the battery and may transfer heat to the accommodation portion 110 so as to heat the aerosol generating article 200 inserted into the accommodation portion 110 of the aerosol generating device 100.

For example, when the aerosol generating article 200 is inserted into the accommodation portion 110 of the aerosol generating device 100, the heater 120 may be positioned close to an outer surface of the aerosol generating article 200. Thus, the heater 120 heated by receiving the power from the battery may increase the temperature of a material portion or a medium portion in the aerosol generating article 200.

The heater 120 may be an electro-resistive heater. For example, the heater 120 may include an electrically conductive track, and the heater 120 may be heated when currents flow through the electrically conductive track. However, the heater 120 is not limited to the example described above and may include any heaters which may be heated to a desired temperature. Here, the desired temperature may be pre-set in the aerosol generating device 100 or may be set by the user.

As another example, the heater 120 may include an induction heater. In detail, the heater 120 may include an electrically conductive coil for heating the aerosol generating article 200 by an induction heating method, and the aerosol generating article 200 may include a susceptor which may be hated by the induction heater 120.

The heater 120 may include at least one from among a tube-type heating element, a plate-type heating element, a needle-type heating element, and a rod-type heating element. Also, the heater 120 may heat the inside or the outside of the aerosol generating article 200, according to the shape of the heating element.

The heater 120 of the aerosol generating device 100 according to an embodiment may be movable along the longitudinal direction of the accommodation portion 110, as shown in FIGS. 1A and 1B.

For example, the heater 120 may be movable from one end of the accommodation portion 110 to the other end of the accommodation portion 110 along the longitudinal direction of the accommodation portion 110, as shown in FIGS. 1A and 1B. The heater 120 may have a shape surrounding the outer surface of the accommodation portion 110. As the heater 120 moves along the longitudinal direction of the accommodation portion 110, heat transferred from the heater 120 to the accommodation portion 110 may be movable along the longitudinal direction of the accommodation portion 110 together with the heater 120.

The aerosol generating device 100 according to an embodiment may include the heater support 130 that supports the heater 120 and moves the heater 120 along the longitudinal direction of the accommodation portion 110. The heater support 130 may guide the movement of the heater 120 along the longitudinal direction of the accommodation portion 110. The heater 120 may be supported by the heater support 130 and may slide along the longitudinal direction of the accommodation portion 110 at predetermined speed.

The heater 120 of the aerosol generating device 100 according to an embodiment may be movable from the first position corresponding to the first point of the aerosol generating article 200 to the second position corresponding to the second point of the aerosol generating article 200. The arrangement of the first position and the second position may be changed according to the specifications of the aerosol generating article 200. Positions of the first point and the second point indicated in the drawings are just exemplary positions and may be changed.

The heater 120 may be supported by the heater support 130 and may be movable from the first position corresponding to the first point of the aerosol generating article 200 to the second position corresponding to the second point of the aerosol generating article 200. As an example, the position of the heater 120 shown in FIG. 1A may be the first position corresponding to the first point of the aerosol generating article 200, and the position of the heater 120 shown in FIG. 1B may be the second position corresponding to the second point of the aerosol generating article 200. However, the first position and the second position of the heater 120 described above are not limited to those shown in the drawings, and may be changed according to embodiments.

In the aerosol generating device 100 according to an embodiment, the first position and the second position of the heater 120 may be changed according to the specifications of the aerosol generating article 200. That is, since the first position and the second position correspond to the first point and the second point of the aerosol generating article 200, respectively, the first position and the second position may differ according to the specifications of the aerosol generating article 200 inserted into the aerosol generating device 100.

The first point and the second point of the aerosol generating article 200 may be changed according to the types, arrangement, sizes, etc. of components of the aerosol generating article 200. For example, with respect to the longitudinal direction of the accommodation portion 110, the positions of a first point and a second point of one aerosol generating article 200 may be different from positions of a first point and a second point of another aerosol generating article 200.

Also, as another example, a distance between the first point and the second point of one aerosol generating article 200 may be greater than a distance between the first point and the second point of another aerosol generating article 200.

Therefore, the specifications of the aerosol generating article 200 need to be detected to match the first position and the second position of the heater 120 to the first point and the second point of the aerosol generating article 200, respectively. The aerosol generating device 100 according to an embodiment may further include a detecting sensor 140 that detects the specifications (e.g., dimensions) of the aerosol generating article 200.

The detecting sensor 140 of the aerosol generating device 100 according to an embodiment may be, for example, arranged adjacent to the aerosol generating article 200 inserted into the aerosol generating device 100, and may detect and recognize the specifications of the inserted aerosol generating article 200. The detecting sensor 140 may detect and recognize the specifications of the aerosol generating article 200. The heater 120 may be displaced so that the first and second positions of the heater 120 may correspond to the first and second points of the aerosol generating article 200, respectively, based on the sensing result from the detecting sensor 220.

The detecting sensor 140 may include, for example, a pressure sensor, a hardness measurement sensor (e.g., push-pull gauge), a resistance measurement sensor, an image sensor, and/or a capacitive measurement sensor. The detecting sensor 140 may sense certain physical properties of the aerosol generating article 200.

Physical properties of the aerosol generating article 200 may be pre-stored in a memory unit (not shown) of the aerosol generating device 100. The physical properties of the aerosol generating article 200 measured through the detecting sensor 140 may be compared with the physical properties stored in the memory unit. As such, the aerosol generating device 100 may detect and distinguish the specifications of the aerosol generating article 200.

The second position of the heater 120 of the aerosol generating device 100 according to an embodiment may be between the first position and the opening 111 of the accommodation portion 110. In other words, the second position of the heater 120 may be closer to the opening 111 of the accommodation portion 110 than the first position is. When the user smokes, the heater 120 of the aerosol generating device 100 may move from the first position to the second position, which means that the heater 120 moves closer to the opening 111 of the accommodation portion 110.

Figure 2A:
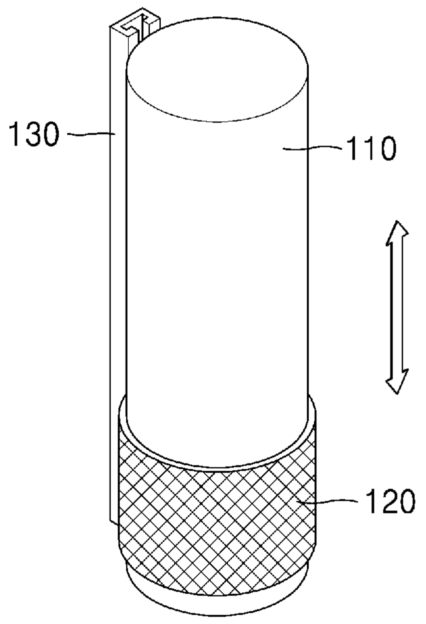
FIG. 2A is a perspective view illustrating one aspect of a heater and a heater support of the aerosol generating device shown in FIG. 1A.
Figure 2B:
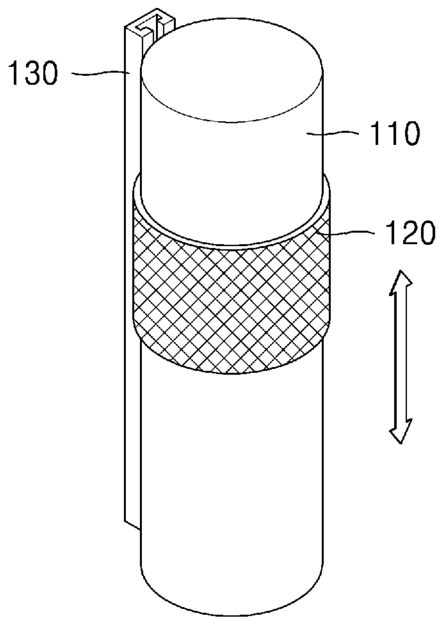
FIG. 2B is a perspective view illustrating another aspect of a heater and a heater support of the aerosol generating device shown in FIG. 1B.

FIG. 2A is a perspective view of the heater 120 and the heater support 130 of the aerosol generating device 100 shown in FIG. 1A according to an embodiment. FIG. 2B is a perspective view of the heater 120 and the heater support 130 of the aerosol generating device 100 shown in FIG. 1B. The heater 120 and the heater support 130 will be described in more detail with reference to FIGS. 2A and 2B.

In the aerosol generating device 100 according to an embodiment, the heater 120 may be supported by the heater support 130 and may move from the first position corresponding to the first point of the aerosol generating article 200 to the second position corresponding to the second point of the aerosol generating article 200. As an example, the position of the heater 120 shown in FIG. 2A may be the first position corresponding to the first point of the aerosol generating article 200, and the position of the heater 120 shown in FIG. 2B may be the second position corresponding to the second point of the aerosol generating article 200. However, the first position and the second position of the heater 120 described above are not limited to those shown in the drawings, and may be changed as necessary.

In the aerosol generating device 100 according to an embodiment, the first position and the second position of the heater 120 may be changed according to the specifications of the aerosol generating article 200, as described above. Thus, a detailed description thereof in an overlapping range will be omitted.

The heater 120 of the aerosol generating device 100 according to an embodiment may surround at least part of the accommodation portion 110 and may slide in the longitudinal direction of the accommodation portion 110. That is, the heater 120 of the aerosol generating device 100 according to an embodiment may be an external heating-type heater that surrounds at least part of the accommodation portion 110 and transfers heat to the inside of the aerosol generating article 200.

The heater 120 according to an embodiment may surround at least part of the accommodation portion 110 of the aerosol generating device 100 and may slide in the longitudinal direction of the accommodation portion 110 based on electrical signals indicating the specifications of the aerosol generating article 200 which is detected by the detecting sensor 140. In this case, the electrical signals may be generated by a processor (not shown) electrically connected to the detecting sensor 140. The detecting sensor 140, the processor, and the heater 120 may be electrically connected to one another.

The heater 120 of the aerosol generating device 100 may be supported by the heater support 130 and may slide in the longitudinal direction of the accommodation portion 110. As an example, the movement of the heater 120 may be performed by a mechanical mechanism. The mechanical mechanism may include a spring structure formed on the heater support 130, for example.

The mechanical mechanism may include a plate spring structure formed on the heater support 130, for example. The plate spring formed on the heater support 130 may be released from a compressed state and when the user smokes. As the plate spring is released, the heater 120 may slide in the longitudinal direction of the accommodation portion 110. In this case, the movement speed of the heater 120 may be adjusted by adjusting the release speed of the plate spring. For example, the heater 120 may be set to move at a certain time when the aerosol generating article 200 is used.

As another example, the movement of the heater 120 may be performed by an electronic mechanism. The electronic mechanism may include a motor installed in the heater support 130, for example. The motor may operate to move the heater 120. As the motor rotates, the heater 120 connected to the motor may slide in the longitudinal direction of the accommodation portion 110. In this case, the rotation speed of the motor may be adjusted so that the movement speed of the heater 120 may be adjusted. The motor formed in the heater support 130 may include a coil motor, a piezo motor, and/or a servo motor, for example.

In the aerosol generating device 100 according to an embodiment, the heater 120 may move from the first position to the second position during a single puff by the user. The aerosol generating device 100 may include a puff sensor that measures the duration of a single puff by the user. The heater 120 of the aerosol generating device 100 may move from the first position to the second position over the measured duration of a single puff by the user. The movement of the heater 120 may be repeatedly performed during the user's smoking time.

The heater 120 may return to the first position after the user's puff ends. That is, the heater 120 may repeatedly move between the first position and the second position, and may transfer heat to the aerosol generating article 200 accommodated in the accommodation portion 110. Thus, aerosol may be generated in the aerosol generating device 100.

In the aerosol generating device 100 according to an embodiment, the heater 120 may move from the first position to the second position over the duration of smoking on a single aerosol generating article 200 by the user. In this case, the duration of smoking may be a time period from the beginning to the end of smoking on a single aerosol generating article 200. The aerosol generating device 100 may repeatedly measure the duration of user's smoking on a single aerosol generating article 200, and set or update the duration of smoking on one aerosol generating article 200 accordingly through an internal processor.

The heater 120 may move from the first position to the second position over the duration of smoking on one set aerosol generating article 200. The heater 120 may be located at the first position when the user starts smoking. When the user's smoking is finished, the heater 120 may be located at the second position.

As an example, when the heater 120 moves by the mechanical mechanism of the heater support 130, the plate spring of the heater support 130 may be released according to the trigger signal of the aerosol generating article 200. The plate spring having a certain tensile force may be released over the duration of smoking on a single aerosol generating article 200 by the user, i.e., a time period from the beginning to the end of smoking on one aerosol generating article 200.

As the plate spring is released over a time corresponding to the duration of smoking of one aerosol generating article 200 by the user, the heater 120 of the aerosol generating device 100 may move from the first position to the second position over the duration of smoking on one aerosol generating article 200 by the user. In this case, the heater 120 may move from the first position to the second position at a certain speed, which may be adjusted by adjusting the release speed of the plate spring.

As another example, when the heater 120 moves using the electrical mechanism of the heater support 130, the motor may be set to rotate over the duration of smoking of one aerosol generating article 200 by the user. In this case, the heater 120 may move in the longitudinal direction of the accommodation portion 110 at a speed corresponding to the rotation speed of the motor, and the movement speed of the heater 120 may be changed by adjusting the rotation speed of the motor.

In the aerosol generating device 100 according to an embodiment, the heater 120 may move from the first position to the second position over a predetermined time period. In this case, the predetermined time period may be appropriately determined to optimize the flavor and taste of the generated aerosol. The predetermined time may be automatically changed according to the specifications of the aerosol generating article 200.

As described above, the heater 120 may move from the first position to the second position over the predetermined time period. This time period may differ according to the specifications of the aerosol generating article 200.

Figure 3:
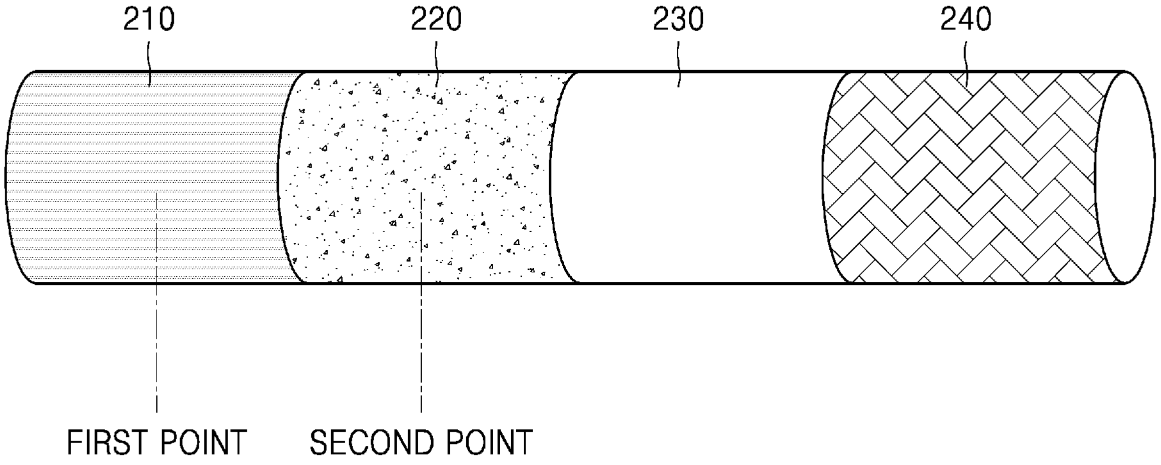
FIG. 3 is a perspective view illustrating an aerosol generating article accommodated in an aerosol generating device according to an embodiment.

FIG. 3 is a perspective view of the aerosol generating article 200 accommodated in the aerosol generating article 100 according to an embodiment.

The aerosol generating article 200 accommodated in the aerosol generating device 100 according to an embodiment may include a plurality of sections. As an example, as shown in FIG. 3, the aerosol generating article 200 may include the first section 210, the second section 220, a third section 230, and a fourth section 240.

The aerosol generating article 200 accommodated in the aerosol generating device 100 according to an embodiment may include a first section 210 and a second section 220.

The first point may be at the first section 210 of the aerosol generating article 200, and the second point may be at the second section 220.

The first section 210 of the aerosol generating article 200 may be a material portion including an aerosol generating material. The aerosol generating material included in the first section 210 may be at least one from among glycerin, propylene glycol, ethylene glycol, dipropylene glycol, diethylene glycol, triethylene glycol, tetraethylene glycol, and oleyl alcohol, but is not limited thereto.

The second section 220 of the aerosol generating article 200 may be a medium portion including a medium. The medium portion may be tobacco including nicotine. Also, the second section 220 may include other additives, such as flavors, a wetting agent, and/or organic acid. Also, the second section 220 may include a flavoring liquid, such as menthol or a moisturizer.

The second section 220 may be manufactured in various forms. The second section 220 may be formed using a sheet or strands, for example. Also, the second section 220 may be formed using tiny tobacco bits which are cut from a tobacco sheet.

The third section 230 of the aerosol generating article 200 may be a cooling portion. The third section 230 may generate an aerosol cooling effect. Thus, the user may inhale the aerosol cooled to a suitable temperature. As an example, the third section 230 may be formed of cellulose acetate and may be a tube-shaped structure including a hollow inside. The third section 230 may be manufactured by adding a plasticizer (e.g., triacetin) to a cellulose acetate tow. As an example, the third section 230 may be formed of paper and may have a tube-shaped structure including a hollow inside.

The fourth section 240 of the aerosol generating article 200 may be a filter portion. The fourth section 240 may be manufactured by adding a plasticizer (e.g., triacetin) to an acetate tow. The fourth section 240 may also be manufactured to generate a flavor. As an example, a flavoring liquid may be injected onto the fourth section 240, or an additional fiber coated with a flavoring liquid may be inserted into the inside of the fourth section 240.

Also, the fourth section 240 may include at least one capsule. Here, the capsule may generate a flavor or an aerosol. For example, the capsule may have a configuration in which a liquid containing a flavoring material is wrapped with a film. The capsule may have a spherical or cylindrical shape, but is not limited thereto.

Figure 4A:
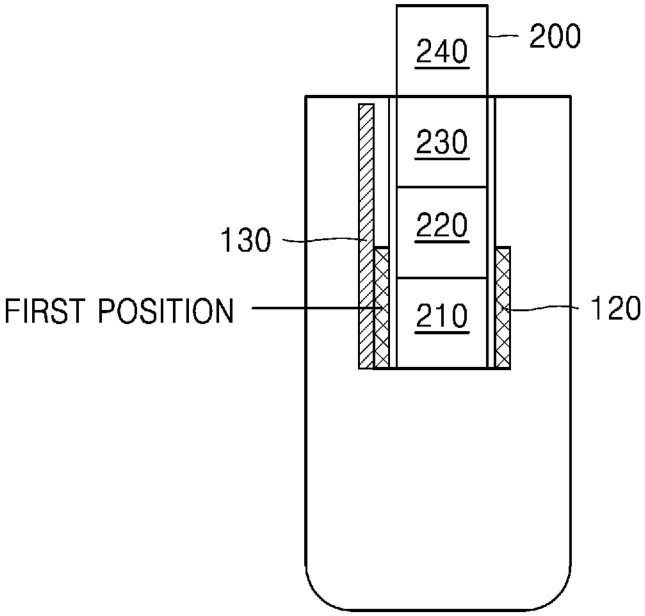
FIG. 4A is a cross-sectional view illustrating one aspect of an aerosol generating device in which the aerosol generating article shown in FIG. 3 is accommodated, according to an embodiment.
Figure 4B:
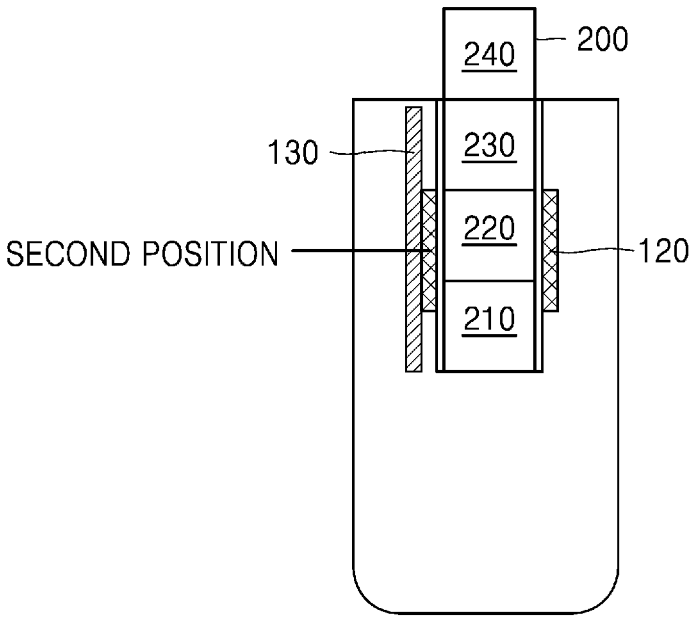
FIG. 4B is a cross-sectional view illustrating another aspect of an aerosol generating device in which the aerosol generating article shown in FIG. 3 is accommodated, according to another embodiment.

FIG. 4A is a cross-sectional view illustrating one aspect of the aerosol generating device 100 in which the aerosol generating article 200 shown in FIG. 3 is accommodated, according to an embodiment. FIG. 4B is a cross-sectional view illustrating another aspect of the aerosol generating device 100 in which the aerosol generating article 200 shown in FIG. 3 is accommodated, according to another embodiment. Referring to FIGS. 4A and 4B, when the aerosol generating article 200 is inserted into the aerosol generating device 100, the position of the heater 120 corresponding to each section of the aerosol generating article 200 will be described in more detail.

As shown in FIG. 4A, when the heater 120 is at the first position, the heater 120 may surround, fully or partially, the first section 210 and the second section 220. That is, the heater 120 at the first position may be in contact with the first section 210 and the second section 220. When the heater 120 is at the first position, the size of an area of the first section 210 surrounded by the heater 120 may be greater than the size of an area of the second section 220 surrounded by the heater 120.

In the aerosol generating device 100 according to an embodiment, when the heater 120 is at the second position, the heater 120 may surround, fully or partially, the first section 210 and the second section 220. That is, the heater 120 at the second position may be in contact with the first section 210 and the second section 220. When the heater 120 is at the second position, the size of an area of the second section 220 surrounded by the heater 120 may be greater than the size of an area of the first section 210 surrounded by the heater 120.

That is, in the aerosol generating device 100 according to an embodiment, the heater 120 may be in contact with all of the first section 210 and the second section 220, while moving from the first position to the second position. Thus, a plurality of sections of the aerosol generating article 200 may be heated with various heating profiles without a plurality of separate heaters. By heating the aerosol generating article 200 according to the plurality of heating profiles using the movable heater 120, the flavor and taste of the aerosol may be improved.

Figure 5:
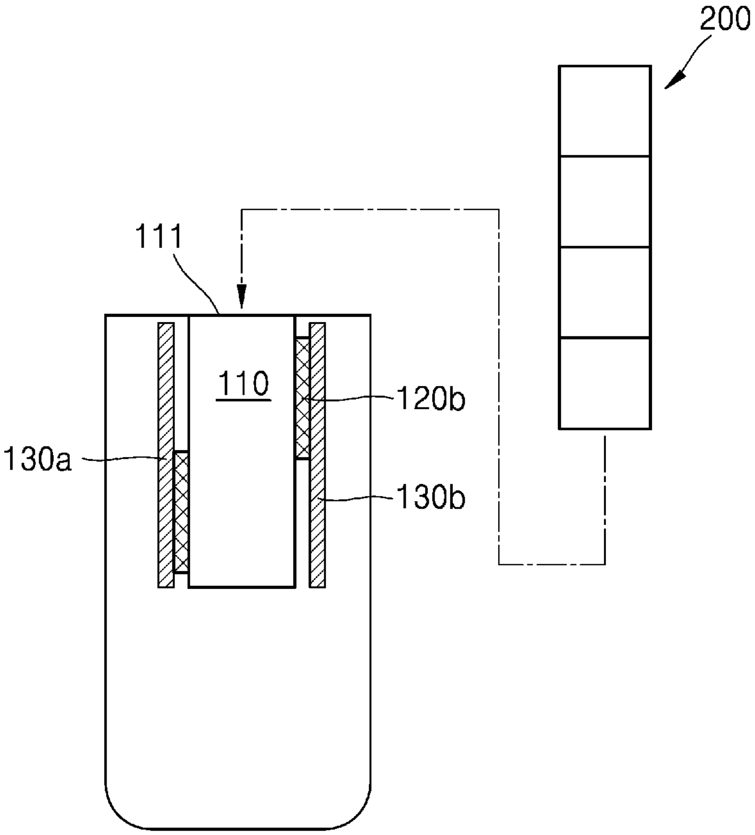
FIG. 5 is a cross-sectional view illustrating an aerosol generating device in which an aerosol generating article is accommodated, according to another embodiment.
Figure 6:
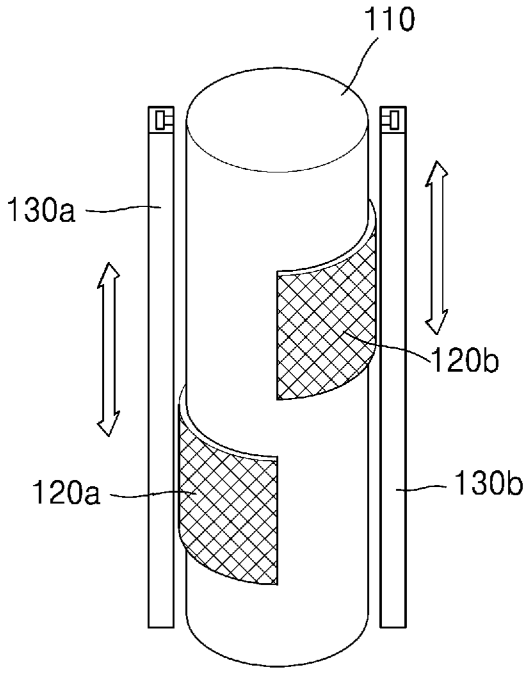
FIG. 6 is a perspective view illustrating a heater and a heater support of the aerosol generating device shown in FIG. 5, according to another embodiment.

FIG. 5 is a cross-sectional view illustrating an aerosol generating device 100 in which an aerosol generating article 200 is accommodated, according to another embodiment. FIG. 6 is a perspective view illustrating a heater 120 and a heater support 130 of the aerosol generating device 100 shown in FIG. 5, according to another embodiment. The aerosol generating device 100 according to another embodiment will be described in more detail with reference to FIGS. 5 and 6.

The heater 120 of the aerosol generating device 100 according to another embodiment may include a plurality of heating compartments 120*a* and 120*b*, and the plurality of heating compartments 120*a* and 120*b* may have respective movement mechanisms.

In this case, the movement mechanism may include at least one of first movement from the first position to the second position and second movement from the second position to the first position.

In the aerosol generating device 100 according to another embodiment, the heater 120 may include a plurality of heating compartments 120*a* and 120*b*. The number of the plurality of heating compartments 120*a* and 120*b* may be two, for example, as shown in FIGS. 5 and 6.

In this case, the plurality of heating compartments 120*a* and 120*b* may have respective movement mechanisms. The respective movement mechanisms may be different from each other. For example, the first heating compartment 120*a* may execute a first movement mechanism of moving from the first position to the second position, while the second heating compartment 120*b* executes a second movement mechanism of moving from the second position to the first position.

The movement mechanisms of the plurality of heating compartments 120*a* and 120*b* may be alternately changed. For example, the first heating compartment 120*a* may move from the first position to the second position through the first movement mechanism and then may move from the second position to the first position through the second movement mechanism. Also, the second heating compartment 120*b* may move from the second position to the first position through the second movement mechanism and then may move from the first position to the second position through the first movement mechanism.

As described above, the first heating compartment 120*a* and the second heating compartment 120*b* may have different movement mechanisms. Thus, the first heating compartment 120*a* and the second heating compartment 120*b* may heat different positions of the aerosol generating article 200. The plurality of heating compartments 120*a* and 120*b* may form a plurality of heating points, which may enable various flavors.

The heater support 130 of the aerosol generating device 100 according to another embodiment may include support members which correspond to the plurality of heating compartments, respectively. For example, when there are two heating compartments, the heater support 130 may include two support members so as to support the heating compartments separately. For example, the heater support 130 may include a first support member 130*a* corresponding to the first heating compartment 120*a*, and a second support member 130*b* corresponding to the second heating compartment 120*b*.

The support members 130*a* and 130*b* may move the heating compartments 120*a* and 120*b* by different movement mechanisms. The support members 130*a* and 130*b* may move the heating compartments 120*a* and 120*b* by mechanical mechanisms or electronic mechanisms. In this case, the mechanisms in which the support members 130*a* and 130*b* move the heating compartments 120*a* and 120*b*, are the same as the mechanism in which the heater support 130 moves the heater 120. Thus, a detailed description thereof in an overlapping range will be omitted.

The plurality of heating compartments of the aerosol generating device 100 according to another embodiment may be arranged in a circumferential direction of the heater 120. That is, the plurality of heating compartments may extend along the circumference of the heater 120 by a certain angle. For example, the circumference may be equally divided so that a surface area of the aerosol generating article covered by each heating compartment may have the same size. However, it is obvious to those skilled in the art that the size and shape of the heating compartment are not limited thereto, and may be changed as necessary.

Figure 7:
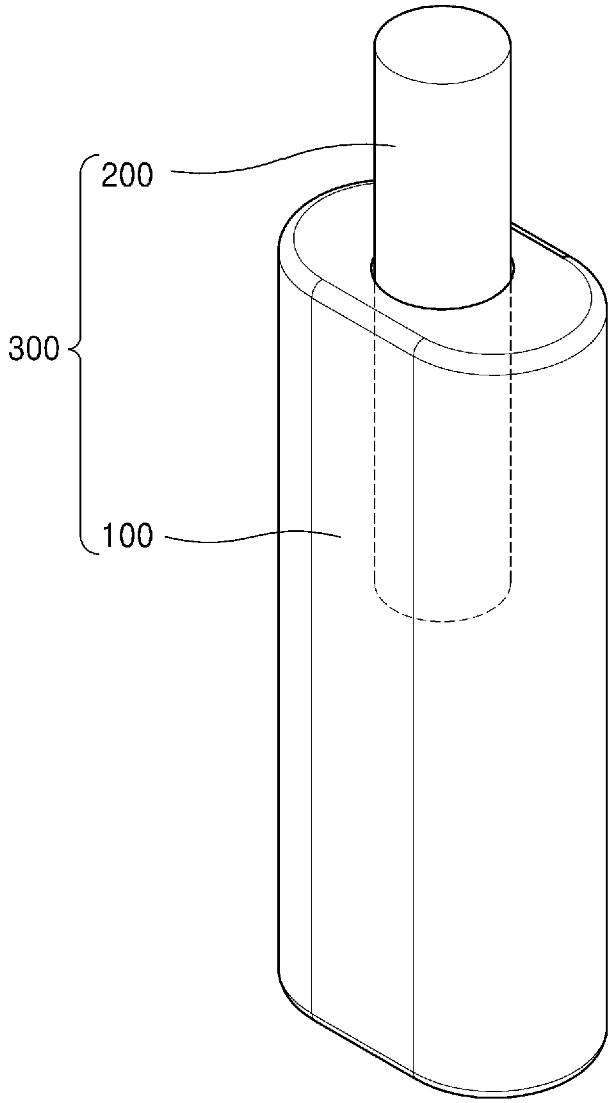
FIG. 7 is a perspective view illustrating an aerosol generating system according to an embodiment.

FIG. 7 is a perspective view illustrating an aerosol generating system according to an embodiment.

An aerosol generating system 300 according to an embodiment may include an aerosol generating device 100 and an aerosol generating article 200 accommodated in the aerosol generating device 100.

The aerosol generating device 100 and the aerosol generating article 200 accommodated in the aerosol generating device 100 may have similar configurations and features described above, and thus, a detailed description thereof in an overlapping range will be omitted.

The aerosol generating device 100 may include a heater 120 that is capable of detecting the aerosol generating article 200 and moving to a position corresponding to a certain heating point of the aerosol generating article 200.

As such, the moveable heater 120 may heat the aerosol generating article 200 with various heating profiles without a plurality of separate heaters. By heating the aerosol generating device 100 according to various heating profiles, the flavor and taste of the aerosol may be improved.

Also, the aerosol generating device 100 and the aerosol generating system 300 including the same according to embodiments may increase energy use efficiency through effective heating. As such, g the charging frequency of the aerosol generating device 100 may be reduced, thereby improving the user's convenience. Also, external heat generation may be effectively reduced, thereby improving stability of the aerosol generating device 100 and safety of the user.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

What is claimed is:

1. An aerosol generating device comprising:
- an accommodation portion configured to accommodate an aerosol generating article through an opening;
- a heater configured to heat the accommodation portion and move along a longitudinal direction of the accommodation portion; and
- a heater support that supports the heater and is configured to move the heater along the longitudinal direction of the accommodation portion,
- wherein the heater is configured to move between a first position corresponding to a first point of the aerosol generating article and a second position corresponding to a second point of the aerosol generating article,
- wherein the first position and the second position differ according to specifications of the aerosol generating article, and
- wherein the heater comprises a plurality of heating compartments having respective movement mechanisms.

2. The aerosol generating device of claim 1, further comprising a detecting sensor configured to detect the specifications of the aerosol generating article.

3. The aerosol generating device of claim 1, wherein the second position is between the first position and the opening of the accommodation portion.

4. The aerosol generating device of claim 1, wherein the heater surrounds at least part of the accommodation portion and is configured to slide in the longitudinal direction of the accommodation portion.

5. The aerosol generating device of claim 1, further comprising a puff sensor configured to measure a duration of a single puff of a user,
- wherein the heater is configured to move from the first position to the second position over the duration.

6. The aerosol generating device of claim 1, wherein the heater is configured to move from the first position to the second position over a duration of user's smoking on a single aerosol generating article.

7. The aerosol generating device of claim 1, wherein the heater is configured to move from the first position to the second position over a predetermined time period.

8. The aerosol generating device of claim 1, wherein the aerosol generating article comprises a first section in which the first point is located, and a second section in which the second point is located.

9. The aerosol generating device of claim 8, wherein the heater surrounds at least part of the first section and at least part of the second section when the heater is located at the first position.

10. The aerosol generating device of claim 9, wherein the heater surrounds at least part of the first section and at least part of the second section when the heater is located at the second position.

11. The aerosol generating device of claim 10, wherein a size of an area of the second section surrounded by the heater is greater than a size of an area of the first section surrounded by the heater when the heater is located at the second position.

12. The aerosol generating device of claim 1, wherein the movement mechanisms comprise at least one of a first movement mechanism for moving from the first position to the second position, and a second movement mechanism for moving from the second position to the first position.

13. The aerosol generating device of claim 1, wherein the heater support comprises a plurality of support members which respectively support and move the plurality of heating compartments along the longitudinal direction of the accommodation portion, and the heating compartments is configured to be moved by the support members.

14. An aerosol generating system comprising:

the aerosol generating device according to claim 1; and an aerosol generating article accommodated in the aerosol generating device.

* * * * *